United States Patent
Domingue, Sr. et al.

(10) Patent No.: US 7,734,530 B1
(45) Date of Patent: Jun. 8, 2010

(54) META-MARKETPLACE METHOD

(75) Inventors: W. Lee Domingue, Sr., Baton Rouge, LA (US); Riley Hagan, III, Shreveport, LA (US); S. Chris Herndon, Sugar Land, TX (US); Parameswaran Ramakrishnan, Baton Rouge, LA (US)

(73) Assignee: Appone Services, Inc., Baton Rouge, LA (US)

( * ) Notice: Subject to any disclaimer, the term of this patent is extended or adjusted under 35 U.S.C. 154(b) by 458 days.

(21) Appl. No.: 11/164,688

(22) Filed: Dec. 1, 2005

Related U.S. Application Data (60) Provisional application No. 60/595,488, filed on Jul. 11, 2005.

(51) Int. Cl.
*G06Q 40/00* (2006.01)

(52) U.S. Cl. ............ 705/37; 705/1; 705/2; 705/4; 705/26; 705/27; 705/31; 705/34; 705/35; 705/36 R; 705/38; 705/39; 701/35; 707/3

(58) Field of Classification Search .......... 705/1, 705/2, 3, 4, 10, 26, 27, 31, 34, 35, 36 R, 37, 705/38, 39; 707/3; 701/35
See application file for complete search history.

(56) References Cited

U.S. PATENT DOCUMENTS

| | | | |
|---|---|---|---|
| 5,550,734 A * | 8/1996 | Tarter et al. ............... | 705/2 |
| 5,878,403 A * | 3/1999 | DeFrancesco et al. ...... | 705/38 |
| 6,208,979 B1 * | 3/2001 | Sinclair .................... | 705/38 |
| 6,347,302 B1 * | 2/2002 | Joao ........................ | 705/36 R |
| 6,411,939 B1 * | 6/2002 | Parsons .................... | 705/35 |
| 6,587,841 B1 * | 7/2003 | DeFrancesco et al. ...... | 705/38 |
| 6,785,661 B1 * | 8/2004 | Dixon et al. ............... | 705/39 |
| 7,302,429 B1 | 11/2007 | Wanker | |
| 2001/0011246 A1 * | 8/2001 | Tammaro ................... | 705/38 |
| 2001/0034663 A1 * | 10/2001 | Teveler et al. ............. | 705/26 |
| 2002/0002502 A1 * | 1/2002 | Maes et al. ................ | 705/26 |
| 2002/0004730 A1 * | 1/2002 | Yoshioka et al. ........... | 705/4 |
| 2002/0016655 A1 * | 2/2002 | Joao ........................ | 701/35 |
| 2002/0026390 A1 * | 2/2002 | Ulenas et al. .............. | 705/27 |
| 2002/0032586 A1 * | 3/2002 | Joao ........................ | 705/4 |
| 2002/0038281 A1 * | 3/2002 | Lohmann et al. ........... | 705/37 |
| 2002/0116374 A1 * | 8/2002 | Bette et al. ................ | 707/3 |
| 2003/0154094 A1 * | 8/2003 | Bredemeier et al. ........ | 705/1 |
| 2004/0172304 A1 * | 9/2004 | Joao ........................ | 705/2 |
| 2005/0010503 A1 * | 1/2005 | Ratnayake ................. | 705/34 |

(Continued)

OTHER PUBLICATIONS

Jill Davidson, Latest Dealer Options: Auto Malls, Convenient Service: Scrambling to attract and keep, customers in tough times; The New York Times, Sunday, Dec. 5, 1995, p. 9.*

(Continued)

*Primary Examiner*—Mary Cheung
*Assistant Examiner*—B. Joan Amelunxen
(74) *Attorney, Agent, or Firm*—Foley & Lardner LLP (57) ABSTRACT

The present invention is a method for handling multiple aspects of the acquisition of vehicles, such as automobiles and trucks, in a unified and streamlined fashion. A system for acquisition of vehicles that integrates various product and service providers with retailers and consumers is presented from various aspects in order to realize efficiencies and opportunities that are impossible in the present mode of vehicle acquisition.

14 Claims, 3 Drawing Sheets

U.S. PATENT DOCUMENTS

| | | | |
|---|---|---|---|
| 2005/0033630 A1* | 2/2005 | Kowalchuk | 705/10 |
| 2005/0273393 A1* | 12/2005 | Ibarra | 705/26 |
| 2006/0206392 A1 | 9/2006 | Rice, Jr. et al. | |
| 2006/0218084 A1* | 9/2006 | Krautter et al. | 705/39 |
| 2008/0162278 A1 | 7/2008 | Hershkovitz et al. | |
| 2008/0281734 A1* | 11/2008 | Longe et al. | 705/31 |

OTHER PUBLICATIONS

Paulson et al., "Financial Access for Immigrants: Lessons from Diverse Perspectives," Federal Reserve Bank of Chicago, The Brookings Institute, Center for the Study of Financial Access for Immigrants and Metropolitan Policy Program, May 2006.

"IRS E-File Application and Participation," Department of the Treasury Internal Revenue Service, Publication 3112 (Rev. 11-04), Catalog No. 25992L, Nov. 2004.

"Handbook for Authorized IRS E-File Providers of Individual Income Tax Returns," Department of the Treasury Internal Revenue Service, Publication 1345 (Rev. 11-04) Catalog No. 64382J, Nov. 2004.

"Filing Season Supplement for Authorized IRS E-File Providers Tax Year 2005," Department of the Treasury Internal Revenue Service, Publication 1345A (Rev. 12-05) Catalog No. 15713E, Dec. 2005.

"2008 ICBA Community Bank Survey: Serving Emerging Markets," ICBA Independent Community Bankers of America, May 2008.

"Banking Immigrant Communities, A Toolkit for Banks and Credit Unions," Appleseed Network, Washington, DC, 2006.

"The CFSI Underbanked Consumer Study Underbanked Consumers Overview and Market Segments, Fact Sheet," The Center for Financial Services Innovation, Jun. 8, 2008.

"National Taxpayer Advocate's 2007 Objectives Report to Congress, vol. II, The Role of the IRS in the Refund Anticipation Loan Industry," United States Department of the Treasury Internal Revenue Service, Jun. 30, 2006.

Britting, Bobbie, "Will Unbanked Outnumber Banked Consumers? Solutions in the Race to Win Share in Underserved Markets," The Tower Group, Inc., Reference #V 56:05C, Jul. 2008.

Elliehausen et al., "Consumer Use of Tax Refund Anticipation Loans," Credit Research Center Monograph #37, Georgetown University, McDonough School of Business, Apr. 2005.

"Refund Anticipation Loan (RAL) Basics," Coalition for Taxpayer Financial Choice, http://www.taxpayerfinancialchoice.com/taxpayer_choices/RAL-information.html, Aug. 1, 2008.

\* cited by examiner

META-MARKETPLACE METHOD

BACKGROUND OF THE INVENTION

The present invention relates to a method and corresponding software program for handling vehicle acquisitions.

In the traditional mode of vehicle acquisition, many individual transactions must be performed in order to complete a transaction, such as pre-qualification for financing, organization of value-added products, insurance and more. Each of these transactions must be handled one at a time, with qualification and/or applicability evaluated for each by a retailer and each party involved. Financing must be qualified, applied for, negotiated, and finalized. Insurance services must be determined for each transaction. Value-added services, such as warranties, must be determined on a case-by-case basis. Trades, payoffs and purchases are handled separately. In short, each aspect of the vehicle acquisition transaction is handled individually as part of a single acquisition, making the overall experience time consuming, complex and prone to error, both because of retailer inexperience and high turnover in the retail vehicle industry, as well as the typical complications that arise from such an involved transaction.

Further, from a service and product provider's standpoint, the system is fraught with complication as well. Retailers must be trained on many different systems, which not only amount to difficulty from a transactional standpoint, but can have legal ramifications as well. For example, serious repercussions can arise should consumer credit laws not be fully complied with. Additionally, retailers generally do not have the resources or know-how to have working relationships with lenders, and certainly do not have the capability to have such relationships with multiple lenders in order to better match consumers to financial institutions. As a result, the ability to negotiate diminishes. Smaller retailers may also not be savvy enough to be cognizant of, much less knowledgeable in, many emerging developments and/or finer points of the transaction, such as extended warranties, GAP insurance and the like. They may also be unaware or unable to exploit additional fee income opportunities, like VIN etching, credit insurance or special credit insurance.

From a lender's perspective, the system is also less than perfect. Risk management in the used car financing realm is commonly filled with defaults, slow pays and collection issues. Reaching the appropriate customers for a financial institution is a "hit or miss" strategy at best, with lenders pointlessly charging many dollars in application fees which will likely never come to fruition. A large number of applications are also never approved, which translates to wasted time and money on the processing of unqualified applicants.

Similarly, other service and product providers are often unable to tap an appreciable percentage of the market because impediments to the market exist. Cost, time and the simple knowledge of who to target leave these providers generally to deal with only a portion of the franchise retailers, who comprise less than half of the estimated overall market, leaving independents a giant untapped resource. Expanding the product base to the many retailers that may not be implementing products and services such as GAP insurance and extended warranties is thus a goal as well.

Obvious downsides to the current method of retail exist. Having to individually handle each component of these vehicle transactions, coupled with the numerous vendors of the varying services, makes the dispensation of the transaction a long and arduous task, as well as making the single act of acquiring an automobile a multi-faceted process rife with the possibility of error and inefficiency. For example, certain financial institutions only offer financing to customers of certain financial aptitude, making submission of some customers' lending requests a moot issue. Certain value-added services are only available to certain customers, and therefore should not be offered. Certain other value-added services should be offered, and oft are not, effectually missing sales. Compliance and consumer credit are required for certain portions of a transaction, and not others. All these nuances in the transaction, coupled with the relative lack of knowledge (partly as result of high turnover) in the vehicle sales representative business, make mistakes and time commitment a very relevant issue.

The consequence of these issues is delayed acquisition, loss of sales, reduced productivity, consumer dissatisfaction, increased floor plan expenses, increases in lender processing, loss of value-added product sales, possible compliance violations and other lost opportunities for consumers, financiers and retailers.

The present invention of a unified transaction is thus a much-improved mode of handling this acquisition process, primarily because it overcomes the multitude of problems recited above by unifying the transactions into a single process, decreasing complexity and costs while simultaneously increasing productivity, breadth of products and offerings available, the number of retailer and service provider relationships, volume of sales and products sold as well as consumer satisfaction. This overall transactional process can be defined as a "metamarket," or a set of related activities that accomplish a single consumer goal. In this case, the metamarket goal is that of the acquisition of an automobile.

In addition to the inherent efficiencies of a metamarket driven by a metamediary, another benefit of the present invention is the resultant drastic reduction in risk and optimized risk management for retailers and lenders in the vehicle acquisition transaction. In the present invention, the "metamediary" (or third party that routes information to appropriate destinations to present a seamless approach to the consumer) has the option to undertake the risk associated with the transaction, such as repossession, collections, re-purchase and the like. In this way, the retailer and bank can be at least partially absolved of responsibility associated with these aspects of the lending transaction, as the metamediary may simply buy back the loan, and undertake to collect or repossess as necessary. Having a cooperative retailer repurchase the repossessed automobiles would also be an option, which could benefit both parties to such a transaction and be yet another aspect of this invention.

Risk is further mitigated by checking for retailer integrity, performing background checks, which aid in the prevention of fraud perpetuated on lenders. All parties can be checked as well, for credit background, financials and the like on all parties involved. This is imperative because the principals of the business may be "clean," but all parties involved should be checked, such as the finance manager, credit manager and so forth. This helps to encourage lenders and other service providers to deal with the smaller retailers, since lenders are often reluctant to deal with retailers whose integrity they cannot account for. It thus becomes difficult to track down and manage bad dealers. The present system thus establishes proper dealer setup procedures, complete with risk management tools. System alerts, thresholds and notifications can be setup to help mitigate risk as well. This type of system can detect loan "hopping" whereby a customer goes from retailer to retailer in an attempt to get a loan. This type of system can detect this behavior and notify the system operator of same. Effective data management by the metamediary thus enables much better client, consumer, lender and service provider management so that the metamarket as a whole is more organic rather than the current mode of disjointed processes.

Of course, there are good reasons for lenders and service providers to be cautious, since it is not unheard of for retailers to (either intentionally or negligently) setup so-called straw purchases, wherein one party signs a loan to purchase a car for someone else; in essence, the party responsible for the loan is not the party who will be driving or housing the automobile. This type of arrangement leads to banks not being able to locate the automobile if and when a repossession is required; therefore this method helps to eliminate risks such as these, and this is but one example of the problems that can be reduced or eradicated by having the metamediary manage the metamarket.

The target of the invention is all vehicle retailers, including car, marine and RV dealers, both franchise (manufacturer-oriented) and individual (local pre-owned) retailers. Other dealers with a similar business plan could also feasibly benefit from this type of system. Individual retailers are more targeted by the present invention, since they stand to gain more from the present invention, and they generally have less infrastructure set up for the aspects of the vehicle acquisition transactions than do the franchise retailers. They also generally do not have the resources or expertise to deal with multiple banks, or other preferred sources of financing. And since there are estimated to be over twice as many individual retailers (55,000 estimated as of this writing) than franchise retailers (25,000 estimated as of this writing), the present invention stands to benefit many businesses across the country. Being able to offer the three primary services to an independent (financing, floor planning and technology) would be a great boon to the marketplace—one this invention seeks to bring about. Essentially then, the metamediary brings together a multiple-retailer, multiple-service provider, multiple lender marketplace for multiple consumers.

Other inventors have attempted to address the presented problem, such as the inventions disclosed in U.S. Pat. Nos. 5,878,403 and 6,587,841 to DeFrancesco and 6,208,979 to Sinclair. However, these references only address the issue of loan applications, and do not address the entire metamarket as does the present invention. Clearly then, the present invention offers a much more complete and efficient solution that has yet to be addressed.

All of these aspects of the current mode of vehicle retailing lead to an increased need for a revised method of vehicle acquisition with minimized cost and complexity, all of which the present invention addresses.

OBJECTS OF THE INVENTION

One object of the invention is to provide a method for handling vehicle acquisition transactions.

Another object of this invention is to provide a method for handling multiple aspects of vehicle acquisition transactions in a single interface.

Yet another object of this invention is to provide a method for handling vehicle acquisitions in a more efficient manner.

Still another object of this invention is to provide a method for vehicle acquisition with decreased complexity for all parties involved in such a transaction.

Still another object of this invention is to provide to financial institutions and other product/service providers a more voluminous, more qualified consumer base to which to offer their services.

Still another object of this invention is to better equip retailer to offer a full spectrum of financing and product offerings to better suit customers and increase revenues.

Still another object of this invention is to reduce number of interaction points between financial institutions/banks, product and service providers and retailers.

Still another object of this invention is to provide a "one-stop shop" services provider for all parties to the vehicular transaction.

Still another object of this invention is to effectively manage dealer risk through the tools and processes of the present invention.

Still another object of this invention is to provide services to both retailers and lenders and service providers by leveraging technology.

Other objects and advantages of this invention shall become apparent from the ensuing descriptions of the invention.

SUMMARY OF THE INVENTION

According to the present invention, a method for handling multiple aspects of the acquisition of vehicles, such as automobiles and trucks, in a unified and streamlined fashion is disclosed. A system for acquisition of vehicles that integrates various product and service providers with retailers and consumers is presented from various aspects in order to realize efficiencies and opportunities that are impossible in the present mode of vehicle acquisition.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
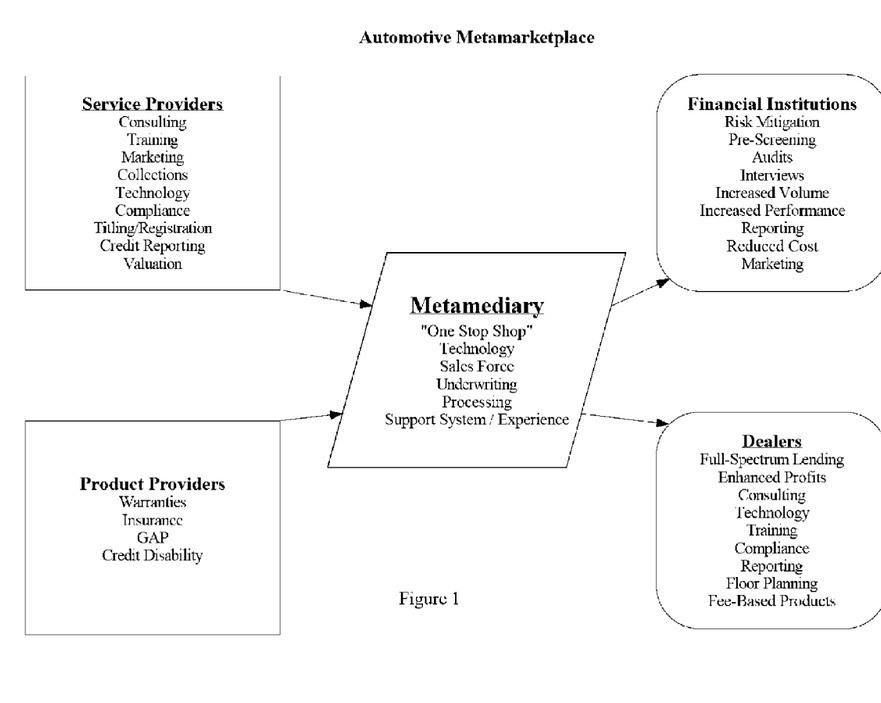
FIG. 1 is a diagram showing the primary players in the metamarket method.
Figure 2:
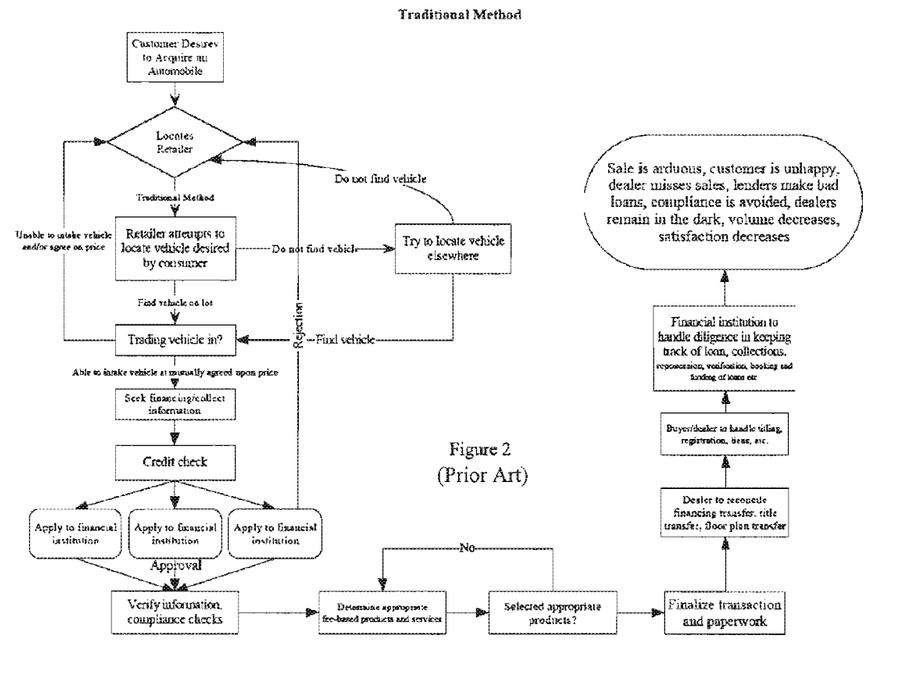
FIG. 2 is a diagram showing the vehicle acquisition process in the traditional method.
Figure 3:
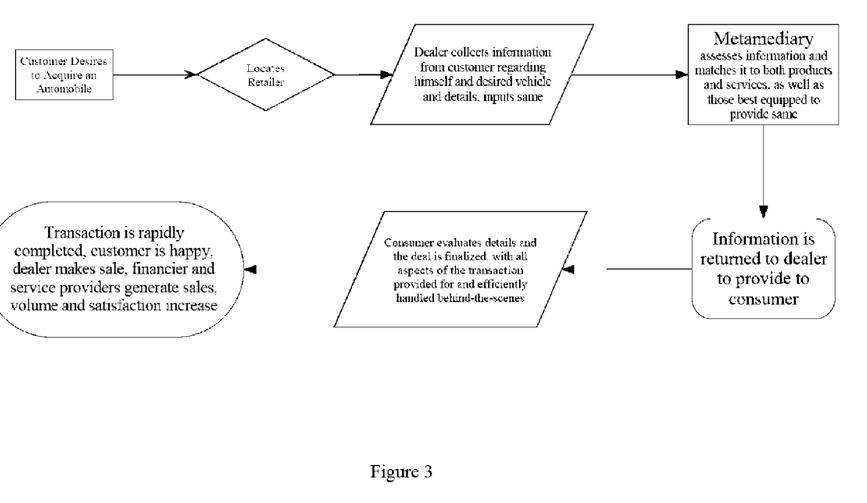
FIG. 3 is a diagram showing the vehicle acquisition process in the metamediary method.

Without any intent to limit the scope of this invention, reference is made to the figures in describing the various embodiments of the invention. FIGS. 1-3 show various aspects of exemplary embodiments of the present invention.

The present invention relates to a "metamediary" serving a "metamarket" within the automobile acquisition segment. A "metamarket" is a set of related activities that accomplish a single consumer goal. In this case, the metamarket goal is that of the acquisition of a vehicle, such as an automobile or truck. This type of transaction presently involves a multitude of individual processes, which can be time consuming and complex. In a retail setting, delays and complications are adverse to effective sales, and thus a reduction in time consumption and complexity are desired. FIG. 2 illustrates the typical fashion in which the vehicle acquisition process is accomplished, and reveals the problems and convolution therein, further demonstrating the need for a reduction in complication and time commitment.

In order to achieve this desired reduction in time and complexity, a "metamediary" is proposed to be employed by the current invention. A "metamediary" is a third party that routes information to appropriate destinations to present a seamless approach to the consumer. The metamediary is generally not the service or product provider, but rather serves as middleman or router of information between the consumer and the myriad service and product providers. FIG. 1 illustrates many of the parties which can be brought together by a metamediary. The presence of this metamediary in essence is a "vendor of trust", building a reputation for the retailer involved in the transaction. The metamediary is able to provide value and services to all entities in the transaction, but especially the retailer, financial institution and end consumer of the vehicle acquisition process. This is illustrated in FIG. 3, where a sample unified transaction is demonstrated.

In order to establish what the present invention seeks to achieve, it is beneficial to examine a typical vehicle transaction. Some of the players in this transaction include:

- The metamediary who operates and maintains the marketplace
- Lending and other financial institutions
- The retailer or "dealer"
- Associated retailers
- Automobile manufacturers
- Underwriting service providers
- Contract processing service providers (providing loan packet audits, customer interviews, etc.)
- Fee based product providers, such as warranty, GAP and credit insurance providers
- Escrow providers
- Consulting services providers
- Sales representatives and marketing service providers
- Technology providers
- Legal and compliance service providers
- Information service providers, such as credit agencies and vehicle valuations
- Collections service providers
- Training service providers
- Loan servicers
- Wholesalers for dispensation of trades, etc.
- Security service providers
- Floor planning service providers
- Auction houses/wholesalers for dealers to procure/sell inventory As can be seen, many players exist in the vehicle acquisition transaction, and many individual considerations must be made for each element involved in such transaction. A consumer will approach a retailer, who seeks to procure an automobile for such consumer. Such automobile may be in his inventory, or he may have to order or transfer the automobile from elsewhere. Once the automobile is located, the consumer must then decide which type of financing he will select. While some consumers will pay cash, the vast majority will finance or lease the automobile. Thus, a vendor for those services must be procured, and matched to the financial qualifications of the consumer. Once this is accomplished, value-added services, such as insurance, warranties, GAP insurance, and so forth will be offered to the consumer, depending on which financing product(s) and automotive products are being obtained. If a trade-in vehicle or vehicle is being accepted as part of the transaction, that vehicle or vehicles must be valuated, (through a service like MMR, NADA or the like) and appropriate dispensation arranged. Payoff of trade in vehicle(s) may also have to be arranged. Credit reports will need to be run, lending service providers contacted, and myriad other minutia addressed. All the while, compliance, privacy and other regulatory aspects must be maintained and laws adhered to, lest the retailers be fined due to regulatory and compliance violations. All of these aspects make the process time consuming and fraught with the possibility of error, not to mention horribly inefficient. Any such inefficiency not only costs the retailer money and time, but may result in the loss of sales due to the complications and time involved. Even should the transaction be appropriately processed, there are numerous inefficiencies that may prevent the customer from being best served, and there are numerous missed opportunities by the retailer and customer alike.

Thus, by consolidating these into the unified marketplace, several benefits may be realized by the different players in the market. Retailers, for instance, benefit by:

- Offering a "One-Stop Shop" offering to end consumers
- Gaining access to multiple financing sources
- Being able to offer full-spectrum lending options to end consumers
- The ability to offer fee-based products
- Enhanced profits through rate participation and fee-based products
- The use of technology solutions (DMS, F&I Software)
- F&I consulting and training
- Assistance in ensuring compliance
- Being able to manage inventory floor planning services
- Having reduced operational costs
- Electronic access to wholesalers/auction houses to purchase/sell inventory
- Consolidated hassle-free paperwork and loan documentation in laser/electronic format
- E-contracts, or the 100% electronic transfer of contract information Other players in the transaction also stand to gain. For instance, financial institutions are given an advantage by having:

- Increased foot print, customer base and retailer base
- Increased volume with minimized startup costs (legwork all done when they sign-up
- Reduced contacts points in an vehicular transaction
- Expanded sales and marketing
- Pre-screening performed by the metamediary or a third-party metamarketplace service provider to reduce processing time
- Electronic contracting to increase productivity and reduce paperwork
- Easier contract audits and review
- Easier access to customer interviews
- Expanded risk mitigation by virtue of a more carefully tailored end consumer and reductions in fraud, ID theft, etc., handling of repossessions and the like, also pre-screening and due diligence conducted by the metamediary or a third party service provider of the retailer before signing them up
- Additional fee based products revenue; increased finance amounts and commissions
- Increased volume due to more compatible consumer to financier matches
- Increased loan portfolio performance because consumers are better suited to the loan product(s)
- Reduced operational costs as a result of fewer collections, interviews, etc., reduction in expenses associated with repossessions and across the board i.e., sales, underwriting, contracting, risk, collections and the like
- Expanded access to technology solutions
- Expanded consulting services Most important to realize about the present invention is its ability to bring together players in the marketplace that might not otherwise have such an opportunity. In fact, historically, it is seen that this is the case. Retailers often have difficulty maintaining one lender, let alone multiple ones. Having each player in the market deal with so many other parties is unrealistic, if not impossible. With the present invention, however, the metamediary undertakes to make all of those connections, and they need only be made once. The metamediary can then handle all aspects of the transaction, or as many or as few as the parties to the transaction desire. The parties then all have the power to deal with these many other players, broadening their ability to negotiate, and find better-suited business transactions.

This system also gives "private label" technology to local and regional banks, providing ease of entry, customizing of information stored in the credit application, and auto-approval. This is a type of custom business logic. Further, insurance products and the like can be privately branded and resold creating additional public exposure and relationship building as a result of that publicity. Rules-based contracting is also employed, which can be setup for each lender, retailer, or other service provider. For example, some lenders may loan up to 125% of a car's loan value, but not include taxes, license fees and so on, while another lender may loan up to 100%, but include taxes and fees. There may also be a maximum debt to income ratio by some lenders, or the ratio could vary from lender to lender. By having all these factors analyzed by the metamediary, the retailer and consumer may focus on making sure the vehicle is appropriate and taking care of customer needs, rather than fighting with paperwork and product offerings.

This type of system affords the metamediary an extraordinary amount of flexibility, whereby product and service providers are contacted by the metamediary, and setup in the system. Lenders and retailers can then be assigned to the other, or the metamediary can be given the latitude to select the best-suited business partner. Similarly, some product and service providers can provide the metamediary with approval criteria, granting the metamediary the ability to approve, the product and service providers can reserve final judgment for themselves, or anywhere in between.

There can be offered a retailer management system module, which aids retailers in the intake of loan applications, the submission of same, and the general business of organizing and compiling data from consumers, service providers and the retailer.

Another module is the back-end module that would be run by the metamediary. This module is used by the metamediary to monitor retailers, maintain current data and offerings from service providers, lenders and retailers.

Lenders can also offer their dealers a loan origination system module, which nearly guarantees a higher chance of being booked than a public portal or other system because the finance product is initially better suited for lenders than the "shotgun" approach by retailers now, who submit the consumer's information to several banks that the customer will not even qualify for, resulting in the banks paying an increase in application fees, and thus, lost margin. Current systems charge the lender for each application submitted, whereas the current model can be tailored to charge the lender for each application, for each qualified application or for each booked loan as the individual case may dictate. Since the number of booked loans is drastically increased because of the present invention's inherent efficiencies in this regard, processing time is reduced and thus there is no need to charge lenders, retailers or consumers for the many unapproved applications that are submitted under the current system.

Additionally, lenders can also be setup on a "back end" loan processing system, which is used to underwrite the credit applications, track contracts in transit and fund loans. This is yet another efficiency, which can be tightly integrated with the loan origination system mentioned above. This is yet another way that the process can be streamlined and efficiencies realized.

Being able to incorporate products also has other advantages, particularly in the realm of floor plan financing. By utilizing the metamediary for floor planning, the retailer can avoid many problems that are typical, such as cash flow and interest. This is accomplished because the metamediary, in handling all aspects of the transaction, can immediately credit a retailer's floor plan account once a car is sold and the loan booked. Having this immediate credit of the purchase reduces the cash flow need, and also minimizes the time that a loan is moved from the floor plan to the customer, where banks are typically double-dipping on interest.

Another module that can be offered is the web/internet module which is integrated with the retailer management system and which enables a retailer to provide a private-labeled website with an application for finance online. Customers can instantly complete and transmit the application, and be notified immediately of their status for financing. This enables them to walk into the dealership knowing precisely what they are able to afford.

Other modules can be offered to retailers as well, depending on need and market. The method can be tailored to fit the retailer, lender and consumer base precisely, so that the most effective, efficient, secure and complete transactions are realized.

Also, as part of this system, the processing, assimilation of data and overall process will be distilled into a unified computer software package. The modules of the system can be represented with software modules that can be enabled or provided as part of a system. Each party will have access to the computer system based on their needs. Lenders, for example, might only have access to an application interface module, while dealers may have access to valuation, acquisition, application, location and auction modules. All modules will be tied together at the metamediary's hub, however, so that it can maintain and facilitate all the transactions and individual aspects that need to be overseen.

While much of the process may be automated, the metamediary will be constantly at work maintaining the infrastructure, adding product and service providers, updating their information and offerings, removing outdated information and so forth, so that all the players engage in a seamless transaction, no matter which part of the transaction they participate in. New lenders can be added, and instantly appear in a retailer's offering. New valuation parties can be available to financial institutions and retailers. New retailers can be made available to lenders.

With such a system, market players can then dictate how large a role in the metamarket they wish to have, or any other specifications they may wish to tailor their business to. To wit, lenders could contact the metamediary to indicate they want more or less business, at which stage the metamediary can work with the lender to expand the possible customer base. Similarly, a retailer can request additional consumers via an internet sales module or other avenues offered by the metamediary. Another example is that risk could be mitigated by classifying retailers on a scale (e.g., "A" "B" "C", etc.) based on their financial background, established stability and so forth. Then, financial institutions or other product and service providers could select to deal with only certain types of retailers, or have a "lesser" party more carefully scrutinized.

Technology will be implemented to speed up the process by eliminating undesired customers or other parties from service providers who do not wish them, as well as alert parties in the transaction to any detected risks within the desired parties. This can be utilized in the reverse as well, permitting retailers to only select grade "A" lenders. This permits the market player to be able to dictate the type of establishment he or she operates. For example, a high-end luxury segment retailer may not want to attract low-income customers, and so he can maintain his "brand" or "product image" by only selecting class "A" lenders. Likewise, warranty companies may not want to deal with retailers who sell primarily cars over ten years old or lenders may not want to deal with retailers whose volume is less than 10 units per month. This system can also extend to the end customer, whereby lenders, retailers, service providers, etc. either exclude or more carefully scrutinize customers who are less than ideal for a particular transaction, e.g., if a customer has two existing car loans, they may not be as desirable as someone with no loans or could present a higher risk of a fraudulent transaction such as a straw purchase, which requires more scrutiny. The present system thus gives the power to all the players to dictate who they deal with, mitigating risk, fortifying the brand, and increasing satisfaction. In essence, all of the aspects of the transaction can be individually controlled and dispensed to the players, giving a precise product to the best-suited player in the metamarket—targeting the correct products for the correct people.

Another feature is that the metamediary, through technology and a sales force can collect statistical information on retailers to determine the scale and match promotions based on the same. For example, to move into "preferred tiers" additional information may be required of a retailer, and thus information can be aggregated for lenders.

In the same vein, service levels can be customized based on party levels and commitments. For example, if a retailer is engaged in floor planning and financing, the financed purchase can be immediately credited to the retailer, and deducted from the floor plan. In this manner, commitments can be obtained from retailers with regard to the volume of business they can commit to the metamediary, lender or other service provider. (e.g., a specified percentage of business, etc.) A retailer would thus get assigned a specified level, and receive from the metamediary a commensurate service level, i.e., increased perks, preferences, or similar benefits. These retailer commitments can, in turn, be allocated to financing institutions and/or other product/service providers, which can be leveraged to obtain better finance rates, service levels and so on from those parties, which can be utilized by the metamediary and/or passed to the retailer/customer. It also aids in forecasting analyses, which adds to the overall predictability of supply and demand and makes for a more consistent experience for all involved.

In this type of arrangement, the metamediary is also put in a position to be able to handle the negotiation on behalf of retailers, or on the part of itself. Rates, terms, promotions, etc. can be positioned by the metamediary to be used to its advantage. For example, if lenders are offering a special rate, the metamediary can choose to continue to sell the product to retailers at the standard rate, pass along the rate as a promotion to the retailer, use it as an incentive for particular retailers as an introductory promotion, reward high-performance retailers, or any other mode the metamediary sees fit. Also, the metamediary is in the position to negotiate on behalf of the retailer, if, for instance, the customer demands, or the transaction otherwise necessitates, compromised terms.

Thus, as one can clearly see, it is preferable to consolidate these and other aspects of the vehicle acquisition transaction into a metamarketplace operated by a metamediary, as provided by the current invention.

In operation, then, the metamediary positions itself by establishing connections with lenders, product and service providers and retailers, effectively assembling a set of vehicle acquisition services and products provided by service and product providers. Examples of these include lenders, warranty companies, GAP Insurers, manufacturers, and the like. By establishing these connections, the metamediary then establishes links with all parties, links that would otherwise be impossible. Once these links are established, the particular information that each party requires can be recorded and made part of the metamarket infrastructure, which can then be accessed later as part of the acquisition process, establishing criteria for each of the acquisition services and products. For example, a car with more than a certain amount of mileage may not be eligible for warranty protection, or a consumer with "C" grade credit might not be eligible for borrowing from a particular lender.

Once the sufficient links are established, the system can begin to operate. Of course, additional links can be added and removed as the method is used. The metamediary is then positioned to be able to handle the transactions as received from the retailers. Once the retailer encounters an interested consumer, he can gather and input a consumer's data relevant to a vehicle acquisition, such as personal data, type of financing sought, type of vehicle, and the like into an interface, such as a computer. At that point, the metamediary, either manually, or automated through the above-mentioned interface, compares the data to the established lender- or service provider-established criteria to determine a consumer's eligibility for said services and products. In relaying this information back to the retailer and then to the consumer, a retailer can determine a consumer's desired array of eligible services and products from those that he/she eligible for. Once this is determined, the retailer can submit said consumer's data to the metamediary and in turn, to the corresponding service and product providers as defined by said desired array of services and products selected by the consumer. The corresponding service and product providers can then be contacted with the consumer's information, and in turn, transmit their approval/denial to the retailers, who receive this information from said service and product providers establishing a subset of the consumer's qualified services and products. At this point, the retailer can assess the consumer's desired services and products selected from the subset of services and products a consumer is qualified for. Finally, the acquisition process can be completed with the set of qualified services and products within said desired array and for which consumer is best qualified being finalized. This would include any necessary documentation, execution of agreements and the like, should they be necessary for the transaction.

It is also a component of this application to claim a software interface method for employing this technique. Clearly, with the assistance of computers and networking components, this process may be streamlined. Data entry, storage and remission can be utilized to reduce processing time and to retain often used data. Data relating to service and product providers may only have to be entered once, and consumer data can be updated rather than re-entered or transcribed for each application for a service or product.

It is important to know that though "services and products" is used in the plural throughout this application, this can refer to a single service and/or product, or no services and/or products should that be the transaction ultimately available or desired to or by a consumer.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A computer-implemented method of facilitating acquisition of a vehicle, comprising:

establishing connections with and operatively linking a retailer and a plurality of providers at a computer-implemented metamediary hub managed by a metamediary to create a computer-implemented metamarket infrastructure, the plurality of providers including at least one lender and at least one of a product and service provider, wherein the retailer is classified, and retailer selection criteria is established for at least one of the plurality of providers, the retailer selection criteria being based upon the retailer classification;

recording and integrating information required by the plurality of providers into the computer-implemented metamarket infrastructure by the computer-implemented metamediary hub;

establishing eligibility criteria received from at least one of the plurality of providers for at least one of a service and product offered by the plurality of providers via the computer-implemented metamediary hub;

receiving data associated with a consumer relevant to the acquisition of the vehicle from the retailer at the computer-implemented metamediary hub, the received data including all the information required by the plurality of providers;

comparing the received data to the eligibility criteria to determine eligibility for the at least one of the service and product offered by the plurality of providers via the computer-implemented metamediary hub;

generating an array of the at least one of the service and product for which the consumer is eligible via the computer-implemented metamediary hub;

forwarding the received data from the computer-implemented metamediary hub to the plurality of providers based on the array, and upon a decision thereon, establishing an approved subset of the at least one of the service and product for which the consumer is eligible via the computer-implemented metamediary hub;

completing at least one transaction based on at least one of the approved subset of the at least one of the service and product for which the consumer is eligible and available terms associated with the at least one of the service and product offered by one of the plurality of providers;

determining retailer integrity of the retailer via the computer-implemented metamediary hub; and determining via the computer-implemented metamediary hub whether the metamediary should assume risk associated with the at least one transaction on behalf of the retailer.

2. The computer-implemented method of facilitating acquisition of a vehicle according to claim 1 further comprising:

recording and integrating information about the retailer into the metamarket infrastructure by the computer-implemented metamediary hub, wherein establishment of the retailer selection criteria for at least one of the plurality of providers is performed via the computer-implemented metamediary hub; and comparing the retailer selection criteria for the at least one of the plurality of providers with the information about the retailer at the computer-implemented metamediary hub to determine if the at least one of the plurality of providers will conduct business with the retailer.

3. The computer-implemented method of facilitating acquisition of a vehicle according to claim 1 further comprising:

establishing provider selection criteria for the retailer at the computer-implemented metamediary hub;

comparing the provider selection criteria with each of the plurality of providers at the computer-implemented metamediary hub to determine if the retailer will conduct business with each of the plurality of providers.

4. The computer-implemented method of facilitating acquisition of a vehicle according to claim 3, wherein each of the plurality of providers is classified, and the provider selection criteria is based upon the provider classification.

5. The computer-implemented method of facilitating acquisition of a vehicle according to claim 1, wherein the eligibility criteria is based upon at least one of the valuation of the vehicle, a vehicle loan value multiplier, provider priority, consumer credit, and consumer affordability.

6. The computer-implemented method of facilitating acquisition of a vehicle according to claim 1 further comprising:

monitoring the retailer and the plurality of providers at the computer-implemented metamediary hub to ensure that the computer-implemented metamediary hub has current data and offerings.

7. The computer-implemented method of facilitating acquisition of a vehicle according to claim 1 further comprising:

establishing approval criteria received from the at least one of the plurality of providers for the at least one of a service and product offered by the plurality of providers at the computer-implemented metamediary hub;

wherein the decision made via the computer-implemented metamediary hub to approve the at least one of the service and product for the consumer is based upon the data and the approval criteria.

8. A system of facilitating acquisition of a vehicle, comprising:

a metamediary hub configured to connect and operatively link a retailer and a plurality of providers within a metamarket managed by a metamediary, the plurality of providers including at least one lender and at least one of a product and service provider;

a computer-implemented application interface module operatively connected to the metamediary hub configured to:

receive eligibility criteria for at least one of a service and product offered by the plurality of providers; and receive information required for the at least one of the service and product offered by the plurality of providers;

a retail management system module operatively connected to the metamediary hub configured to:

receive data associated with a consumer relevant to the acquisition of the vehicle from the retailer, the data including all the information required for the at least one of the service and product offered by the plurality of providers; and complete at least one transaction based on at least one of an approved subset of the at least one of the service and product for which the consumer is eligible and available terms associated with the at least one of the service and product offered by one of the plurality of providers;

wherein the metamediary hub is further configured to:

record and integrate the information required for the at least one of the service and product offered by the plurality of providers into the metamarket infrastructure;

compare the received data to the eligibility criteria to determine eligibility for the at least one of the service and product offered by the plurality of providers;

generate an array of the at least one of the service and product for which the consumer is eligible;

forward the received data to the plurality of providers based upon the array, and establish an approved subset of the at least one of the service and product for which the consumer is eligible;

determine the available terms associated with the at least one of the service and product offered by the one of the plurality of providers;

classify the retailer, and establish retail selection criteria for at least one of the plurality of providers based upon a retailer classification; and determine the integrity of the retailer, and determine whether the metamediary should assume risk associated with the at least one transaction on behalf of the retailer.

9. The system of facilitating acquisition of a vehicle according to claim 8, wherein the computer-implemented application interface module is further configured to receive the retailer selection criteria for at least one of the plurality of providers, and wherein the metamediary hub is further configured to record and integrate retailer information into the metamarket infrastructure and compare the retailer selection criteria for the at least one of the plurality of providers with the retailer information to determine if the at least one of the plurality of providers will conduct business with the retailer.

10. The system of facilitating acquisition of a vehicle according to claim 8, wherein the retail management system module is further configured to receive a provider selection criteria, and wherein the metamediary hub is further configured to compare the provider selection criteria to each of the plurality of providers to determine if the retailer will conduct business with each of the plurality of providers.

11. The system of facilitating acquisition of a vehicle according to claim 10, wherein the metamediary hub is further configured to classify each of the plurality of providers, and the provider selection criteria is based upon the provider classification.

12. The system of facilitating acquisition of a vehicle according to claim 8, wherein the eligibility criteria is based upon at least one of the valuation of the vehicle, a vehicle loan value multiplier, provider priority, consumer credit, and consumer affordability.

13. The system of facilitating acquisition of a vehicle according to claim 8 further comprising, a back-end module operatively connected to the metamediary hub configured to monitor the retailer and the plurality of providers to ensure that the metamediary has current data and offerings.

14. The system of facilitating acquisition of a vehicle according to claim 8, wherein the computer-implemented application interface module is further configured to receive approval criteria for the at least one of the service and product offered by the plurality of providers and wherein the metamediary hub is further configured to approve the consumer for the at least one of the service and product offered by the plurality of providers.

* * * * *